US010296265B2

(12) United States Patent
Taguchi

(10) Patent No.: US 10,296,265 B2
(45) Date of Patent: May 21, 2019

(54) REDUCED DATA ACCESS TIME ON TAPE WITH DATA REDUNDANCY

(71) Applicant: International Business Machines Corporation, Armonk, NY (US)

(72) Inventor: Kohei Taguchi, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 15/374,224

(22) Filed: Dec. 9, 2016

(65) Prior Publication Data

US 2018/0165017 A1    Jun. 14, 2018

(51) Int. Cl.
*G06F 3/06* (2006.01)

(52) U.S. Cl.
CPC .......... *G06F 3/0686* (2013.01); *G06F 3/061* (2013.01); *G06F 3/0644* (2013.01); *G06F 3/0659* (2013.01)

(58) Field of Classification Search
CPC combination set(s) only.
See application file for complete search history.

(56) References Cited

U.S. PATENT DOCUMENTS

| 6,505,216 | B1 * | 1/2003 | Schutzman | ......... | G06F 11/1456 |
| 8,041,921 | B2 | 10/2011 | Ashton et al. | | |
| 8,566,517 | B1 | 10/2013 | Sims et al. | | |
| 8,862,815 | B2 | 10/2014 | Eleftheriou et al. | | |
| 2008/0256418 | A1 * | 10/2008 | Luby | ..................... | H03M 13/27 714/762 |
| 2016/0004439 | A1 | 1/2016 | Johnson et al. | | |
| 2016/0092315 | A1 | 3/2016 | Ashida et al. | | |

OTHER PUBLICATIONS

Moore Fred, "LTFS Fueling the Tape Transformation," Horison Information Strategies, 2015, pp. 1-8.
Coyne et al., "IBM Tape Library Guide for Open Systems," Redbooks, Jan. 2016, pp. 1-472.
Taguchi, K., U.S. Appl. No. 16/287,956, filed Feb. 27, 2019.

* cited by examiner

*Primary Examiner* — Yong J Choe
(74) *Attorney, Agent, or Firm* — Zilka-Kotab, P.C.

(57) ABSTRACT

A computer-implemented method, according to one embodiment, includes: selecting a first tape to write a first copy of a first portion of data to, sending an instruction to write the first copy of the first portion of data to a first partition on the first tape, wherein the first tape has at least the first partition and a second partition, selecting a second tape that is different than the first tape to write a second copy of the first portion of data to, and sending an instruction to write the second copy of the first portion of data to a second partition on the second tape, wherein the second tape has at least a first partition and the second partition. The first partition on each of the first and second tapes is closer to a beginning of the respective tape than the second partition on the respective tape.

20 Claims, 14 Drawing Sheets

REDUCED DATA ACCESS TIME ON TAPE WITH DATA REDUNDANCY

BACKGROUND

The present invention relates to data storage systems, and more particularly, this invention relates to reducing the amount of time associated with accessing data from tape.

Automated data storage libraries are known for providing cost effective storage and retrieval of large quantities of data. The data in automated data storage libraries is typically stored on media of data storage cartridges that are, in turn, stored at storage slots or the like inside the library in a fashion that renders the media, and its resident data, accessible for physical retrieval. Such data storage cartridges are commonly termed "removable media." Data storage cartridge media may comprise any type of media on which data may be stored and which may serve as removable media, including but not limited to magnetic media (such as magnetic tape or disks), optical media (such as optical tape or disks), electronic media (such as PROM, EEPROM, flash PROM, CompactFlash™, Smartmedia™, Memory Stick™, etc.), or other suitable media. An example of a data storage cartridge that is widely employed in automated data storage libraries for mass data storage is a magnetic tape cartridge.

In addition to data storage media, automated data storage libraries typically comprise data storage drives that store data to, and/or retrieve data from, the data storage cartridge media. Further, automated data storage libraries typically comprise I/O stations at which data storage cartridges are supplied or added to, or removed from, the library. The transport of data storage cartridges between data storage slots, data storage drives, and I/O stations is typically accomplished by one or more accessors. Such accessors have grippers for physically retrieving the selected data storage cartridges from the storage slots within the automated data storage library and transporting such cartridges to the data storage drives by moving, for example, in the horizontal (X) and vertical (Y) directions.

As storage capacity increases, the amount of time and effort involved with accessing a desired segment of data rises as well. Not only is there more data to sift through in order to find a desired segment of data, but accessing that data even after it has been located is increasingly difficult as well.

SUMMARY

A computer-implemented method, according to one embodiment, includes: selecting a first tape to write a first copy of a first portion of data to, sending an instruction to write the first copy of the first portion of data to a first partition on the first tape, wherein the first tape has at least the first partition and a second partition, selecting a second tape that is different than the first tape to write a second copy of the first portion of data to, and sending an instruction to write the second copy of the first portion of data to a second partition on the second tape, wherein the second tape has at least a first partition and the second partition. The first partition on each of the first and second tapes is closer to a beginning of the respective tape than the second partition on the respective tape.

A computer program product, according to another embodiment, includes a computer readable storage medium having program instructions embodied therewith, the program instructions executable by a processor to cause the processor to: select, by the processor, a first tape to write a first copy of a first portion of data to, send, by the processor, an instruction to write the first copy of the first portion of data to a first partition on the first tape, wherein the first tape has at least the first partition and a second partition, select, by the processor, a second tape that is different than the first tape to write a second copy of the first portion of data to, and send, by the processor, an instruction to write the second copy of the first portion of data to a second partition on the second tape, wherein the second tape has at least a first partition and the second partition. The first partition on each of the first and second tapes is closer to a beginning of the respective tape than the second partition on the respective tape.

A computer program product, according to yet another embodiment, includes a computer readable storage medium having program instructions embodied therewith, the program instructions executable by a processor to cause the processor to: receive, by the processor, a request to read a portion of data, determine, by the processor, whether the portion of data is located in a first partition of a tape loaded in a tape drive, send, by the processor, an instruction to read the portion of data from the first partition in response to determining that the portion of data is located in the first partition of the tape loaded in the tape drive, determine, by the processor, whether the portion of data is located in a second partition of the tape loaded in the tape drive in response to determining that the portion of data is not located in the first partition of the tape loaded in the tape drive, and send, by the processor, an instruction to read the portion of data from the second partition in response to determining that the portion of data is located in the second partition of the tape loaded in the tape drive. The first partition is closer to a beginning of the tape than the second partition.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

Figure 1:
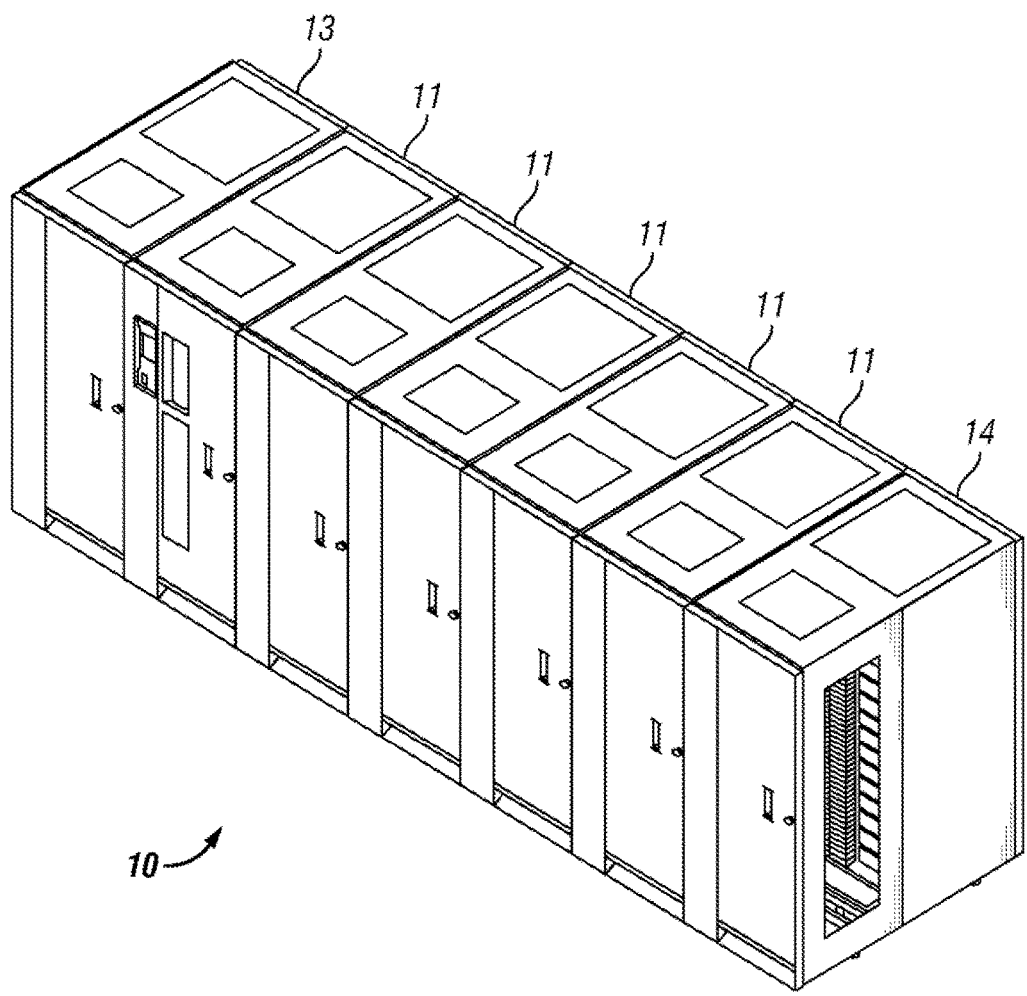
FIG. 1 is a perspective view of an automated data storage library according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems having reduced data access times, as well as operation and/or component parts thereof. By implementing improved processes of writing data and/or reading data according to the various embodiments described herein, the amount of time associated with accessing data from tape may desirably be reduced. Moreover, data redundancy may also be achieved by the embodiments included herein, thereby also providing added safeguards against data loss.

In one general embodiment, a computer-implemented method includes: selecting a first tape to write a first copy of a first portion of data to, sending an instruction to write the first copy of the first portion of data to a first partition on the first tape, wherein the first tape has at least the first partition and a second partition, selecting a second tape that is different than the first tape to write a second copy of the first portion of data to, and sending an instruction to write the second copy of the first portion of data to a second partition on the second tape, wherein the second tape has at least a first partition and the second partition. The first partition on each of the first and second tapes is closer to a beginning of the respective tape than the second partition on the respective tape.

In another general embodiment, a computer program product includes a computer readable storage medium having program instructions embodied therewith, the program instructions executable by a processor to cause the processor to: select, by the processor, a first tape to write a first copy of a first portion of data to, send, by the processor, an instruction to write the first copy of the first portion of data to a first partition on the first tape, wherein the first tape has at least the first partition and a second partition, select, by the processor, a second tape that is different than the first tape to write a second copy of the first portion of data to, and send, by the processor, an instruction to write the second copy of the first portion of data to a second partition on the second tape, wherein the second tape has at least a first partition and the second partition. The first partition on each of the first and second tapes is closer to a beginning of the respective tape than the second partition on the respective tape.

In yet another general embodiment, a computer program product includes a computer readable storage medium having program instructions embodied therewith, the program instructions executable by a processor to cause the processor to: receive, by the processor, a request to read a portion of data, determine, by the processor, whether the portion of data is located in a first partition of a tape loaded in a tape drive, send, by the processor, an instruction to read the portion of data from the first partition in response to determining that the portion of data is located in the first partition of the tape loaded in the tape drive, determine, by the processor, whether the portion of data is located in a second partition of the tape loaded in the tape drive in response to determining that the portion of data is not located in the first partition of the tape loaded in the tape drive, and send, by the processor, an instruction to read the portion of data from the second partition in response to determining that the portion of data is located in the second partition of the tape loaded in the tape drive. The first partition is closer to a beginning of the tape than the second partition.

Figure 2:
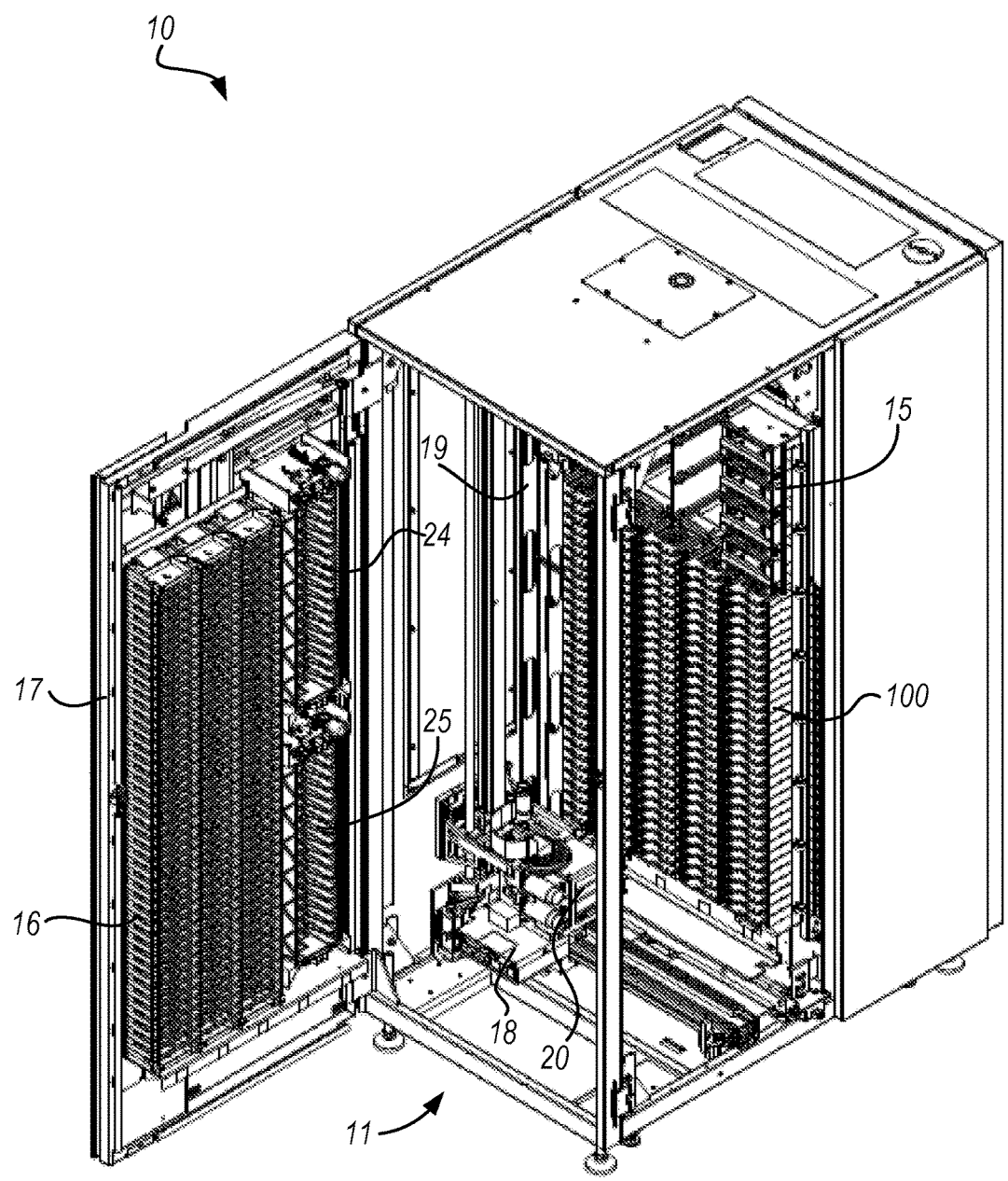
FIG. 2 is a perspective view of a storage frame from the data storage library of FIG. 1.

FIGS. 1-2 illustrate an automated data storage library 10 which stores and retrieves data storage cartridges, containing data storage media (not shown), from multi-cartridge deep slot cells 100 and single cartridge storage slots 16. An example of an automated data storage library which has a similar configuration as that depicted in FIGS. 1-2, and may be implemented with some of the various approaches herein is the IBM 3584 UltraScalable Tape Library. Moreover, it should be noted that references to "data storage media" herein refer to data storage cartridges, and for purposes of the present application, the two terms may be used synonymously.

The library 10 of FIG. 1 comprises a left hand service bay 13, one or more storage frames 11, and right hand service bay 14. As will be discussed in further detail below, a frame may comprise an expansion component of the library. Thus, storage frames may be added or removed to expand or reduce the size and/or functionality of the library. According to different approaches, frames may include additional storage slots, deep slot cells, drives, import/export stations, accessors, operator panels, etc.

FIG. 2 shows an exemplary embodiment of a storage frame 11, which acts as the base frame of the library 10. Moreover, the storage frame 11 illustrated in FIG. 2 is contemplated to be a minimum configuration of the library 10, for which there is only a single accessor 18 (i.e., there are no redundant accessors) and no service bay. However, in other embodiments, a storage frame may include multiple robotic accessors and/or service bays.

Looking to FIG. 2, the library 10 is arranged for accessing data storage media in response to commands from at least one external host system (not shown). The library 10 includes a plurality of storage slots 16 on front wall 17 and a plurality of multi-cartridge deep slot cells 100 on rear wall 19, both of which may be used for storing data storage cartridges that may contain data storage media. According to one approach, the storage slots 16 are configured to store a single data storage cartridge, and the multi-cartridge deep slot cells 100 may be configured to store more than one data storage cartridge.

With continued reference to FIG. 2, the storage frame 11 of the library 10 also includes at least one data storage drive 15, e.g., for reading and/or writing data with respect to the data storage media. Additionally, a first accessor 18 may be used to transport data storage media between the plurality of storage slots 16, the multi-cartridge deep slot cells, and/or the data storage drive(s) 15. According to various approaches, the data storage drives 15 may be optical disk drives, magnetic tape drives, solid state drives having non-volatile random access memory (NVRAM) such as Flash memory, or other types of data storage drives as are used to read and/or write data with respect to the data storage media.

As illustrated, the storage frame 11 may optionally include an operator panel or other user interface, such as a web-based interface, which allows a user to interact with the library 10. The storage frame 11 may also optionally comprise an upper I/O station 24 and/or a lower I/O station 25, thereby allowing data storage cartridges to be added (e.g., inserted) to the library inventory and/or removed from the library without disrupting library operation. Furthermore, the library 10 may have one or more storage frames 11, each having storage slots 16, preferably accessible by the first accessor 18.

As described above, the storage frames 11 may be configured with different components depending upon the intended function. One configuration of storage frame 11 may comprise storage slots 16 and/or multi-cartridge deep slot cells 100, data storage drive(s) 15, and other optional components to store and retrieve data from the data storage cartridges. However, in another approach, a storage frame 11 may include storage slots 16 and/or multi-cartridge deep slot cells 100 and no other components. The first accessor 18 may have a gripper assembly 20, e.g., for gripping one or more data storage media, in addition to having a bar code scanner or other reading system, such as a cartridge memory reader or similar system mounted on the gripper assembly 20, to "read" identifying information about the data storage media.

Figure 3:
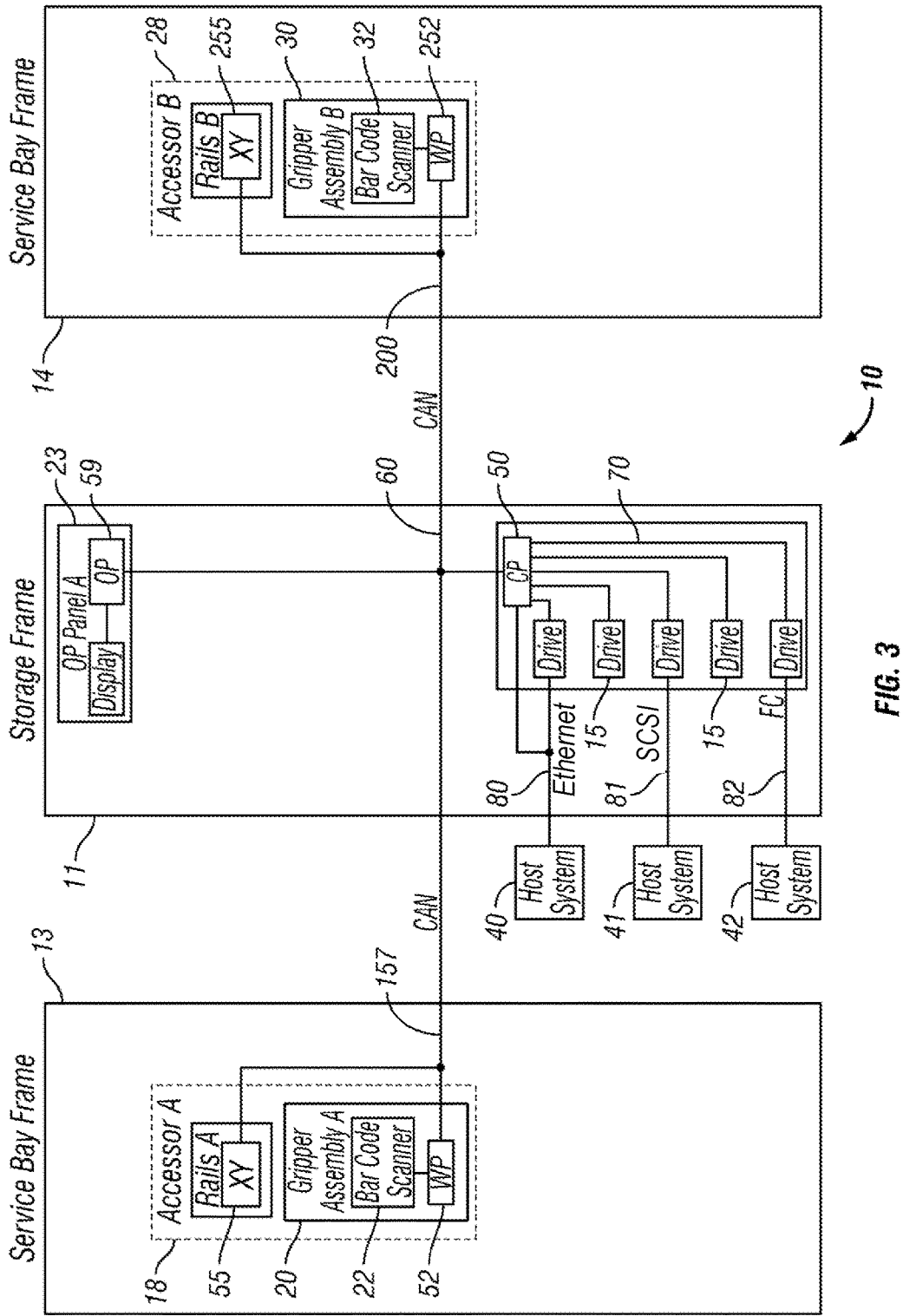
FIG. 3 is a block diagram of an automated data storage library according to one embodiment.

FIG. 3 depicts an automated data storage library 10, in accordance with one embodiment. As an option, the present automated data storage library 10 may be implemented in conjunction with features from any other embodiment listed herein, such as those described with reference to the other FIGS. Of course, however, such automated data storage library 10 and others presented herein may be used in various applications and/or in permutations which may or may not be specifically described in the illustrative embodiments listed herein. Further, the automated data storage library 10 presented herein may be used in any desired environment. Thus FIG. 3 (and the other FIGS.) should be deemed to include any and all possible permutations Referring now to FIG. 3, the automated data storage library 10 as described in reference to FIGS. 1 and 2, is depicted according to one embodiment. According to a preferred approach, the library 10 may employ a controller, e.g., arranged as a distributed system of modules with a plurality of processor nodes.

In one approach, the library is controlled, not by a central controller, but rather, by a distributed control system for receiving logical commands and converting the commands to physical movements of the accessor and gripper, and for operating the drives in accordance with the desired physical movements. The distributed control system may also provide logistical support, such as responding to host requests for element status, inventory, library status, etc. The specific commands, the conversion of those commands to physical movements, and the operation of the drives may be of a type known to those of skill in the art.

While the automated data storage library 10 has been described as employing a distributed control system, various other approaches described and/or suggested herein may be implemented in automated data storage libraries regardless of control configuration, such as, but not limited to, an automated data storage library having one or more library controllers that are not distributed.

Referring still to FIG. 3, the library 10 may have one or more storage frames 11, a left hand service bay 13 and a right hand service bay 14. The left hand service bay 13 is shown with a first accessor 18, where, as discussed above, the first accessor 18 may include a gripper assembly 20 and/or a bar code scanner (e.g., reading system) to "read" identifying information about the data storage media depending on the desired embodiment. Furthermore, the right hand service bay 14 is shown having a second accessor 28, which includes a gripper assembly 30 and may also include a reading system 32 to "read" identifying information about the data storage media.

According to one approach, in the event of a failure or other unavailability of the first accessor 18, or its gripper assembly 20, etc., the second accessor 28 may perform some or all of the functions of the first accessor 18. Thus in different approaches, the two accessors 18, 28 may share one or more mechanical paths, they may have completely independent mechanical paths, or combinations thereof. In one example, the accessors 18, 28 may have a common horizontal rail with independent vertical rails to travel therealong. Moreover, it should be noted that the first and second accessors 18, 28 are described as first and second for descriptive purposes only and this description is not meant to limit either accessor to an association with either the left hand service bay 13, or the right hand service bay 14.

In an exemplary embodiment which is in no way intended to limit the invention, the first and second accessors 18, 28 may preferably move their grippers in at least two directions, called the horizontal "X" direction and vertical "Y" direction, e.g., to retrieve and grip, deliver and release, load and unload, etc. the data storage cartridge at the storage slots 16, multi-cartridge deep slot cells 100, data storage drives 15, etc.

With continued reference to FIG. 3, library 10 receives commands from one or more host systems 40, 41, 42. The host systems 40, 41, 42, such as host servers, communicate with the library directly, e.g., on connection 80, through one or more control ports (not shown), or through one or more data storage drives 15 on connections 81, 82. Thus, in different approaches, the host systems 40, 41, 42 may provide commands to access particular data storage cartridges and move the cartridges, for example, between the storage slots 16 and the data storage drives 15. The commands are typically logical commands identifying the cartridges or cartridge media, and/or logical locations for accessing the media. Furthermore, it should be noted that the terms "commands" and "work requests" are used interchangeably herein to refer to such communications from the host system 40, 41, 42 to the library 10 as are intended to result in accessing particular data storage media within the library 10 depending on the desired approach.

According to one embodiment, the library 10 may be controlled by a library controller. Moreover, in various approaches, the library controller may include a distributed control system receiving the logical commands from hosts, determining the required actions, and/or converting the actions to physical movements of the first and/or second accessor 18, 28. In another approach, the distributed control system may have a plurality of processor nodes, each having one or more computer processors. According to one example of a distributed control system, a communication processor node 50 may be located in a storage frame 11. The communication processor node provides a communication link for receiving the host commands, either directly or through the drives 15, via at least one external interface, e.g., coupled to connection 80.

Still referring to FIG. 3, the communication processor node 50 may additionally provide a communication link 70 for communicating with the data storage drives 15. As illustrated, the communication processor node 50 may preferably be located in the storage frame 11, e.g., close to the data storage drives 15. Furthermore, one or more additional work processor nodes may be provided to form an exemplary distributed processor system, which may comprise, e.g., a work processor node 52 located at first accessor 18, and that is coupled to the communication processor node 50 via a network 60, 157. According to different approaches, each work processor node may respond to received commands that are broadcast thereto from any communication processor node, and the work processor nodes may also direct the operation of the accessors, e.g., providing move commands. An XY processor node 55 may be provided and may be located at an XY system of first accessor 18. As illustrated, the XY processor node 55 is coupled to the network 60, 157, and is responsive to the move commands, operating the XY system to position the gripper assembly 20.

Also, an operator panel processor node 59 may be provided at the optional operator panel for providing an interface for communicating between the operator panel and the communication processor node 50, the work processor nodes 52, 252, and the XY processor nodes 55, 255.

A network 60, for example comprising a common bus, is provided, coupling the various processor nodes. The network may comprise a robust wiring network, such as the commercially available Controller Area Network (CAN) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

As illustrated in FIG. 3, the communication processor node 50 is coupled to each of the data storage drives 15 of a storage frame 11, via communication links 70, and are thereby communicating with the drives 15 and with host systems 40, 41, 42. Alternatively, the host systems 40, 41, 42 may be directly coupled to the communication processor node 50, at connection 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, host connections 80 and 81 are intended to be Ethernet and a SCSI bus, respectively, e.g., and may serve as host connections. However, connection 82 may be a bus. According to an example, connection 82 may include a Fibre Channel bus which is a high speed serial data interface, allowing transmission over greater distances than the SCSI bus systems.

According to some approaches, the data storage drives 15 may be in close proximity to the communication processor node 50, and may employ a short distance communication scheme, such as Ethernet, or a serial connection, such as RS-422. Thus the data storage drives 15 may be individually coupled to the communication processor node 50 by communication links 70. Alternatively, the data storage drives 15 may be coupled to the communication processor node 50 through one or more networks.

Furthermore, additional storage frames 11 may be provided, whereby each is preferably coupled to the adjacent storage frame. According to various approaches, any of the additional storage frames 11 may include communication processor nodes 50, storage slots 16, data storage drives 15, networks 60, etc.

Moreover, as described above, the automated data storage library 10 may comprise a plurality of accessors. A second accessor 28, for example, is shown in a right hand service bay 14 of FIG. 3. The second accessor 28 may include a gripper assembly 30 for accessing the data storage media, and an XY system 255 for moving the second accessor 28. The second accessor 28 may run on the same horizontal mechanical path as the first accessor 18, and/or on an adjacent (e.g., separate) path. Moreover the illustrative control system additionally includes an extension network 200 which forms a network coupled to network 60 of the storage frame(s) 11 and to network 157 of left hand service bay 13.

In FIG. 3 and the accompanying description, the first and second accessors are associated with the left hand service bay 13 and the right hand service bay 14 respectively. However, this is for illustrative purposes and there may not be an actual association. Thus, according to another approach, network 157 may not be associated with the left hand service bay 13 and network 200 may not be associated with the right hand service bay 14. Moreover, depending on the design of the library, it may not be necessary to have a left hand service bay 13 and/or a right hand service bay 14 at all.

An automated data storage library 10 typically comprises one or more controllers to direct the operation of the automated data storage library. Moreover, host computers and data storage drives typically include similar controllers. A library controller may take many different forms and may comprise, for example, but is not limited to, an embedded system, a distributed control system, a personal computer, a workstation, etc. The term "library controller" as used herein is intended in its broadest sense as a device that includes at least one processor, and optionally further circuitry and/or logic, for controlling and/or providing at least some aspects of library operations.

Figure 4:
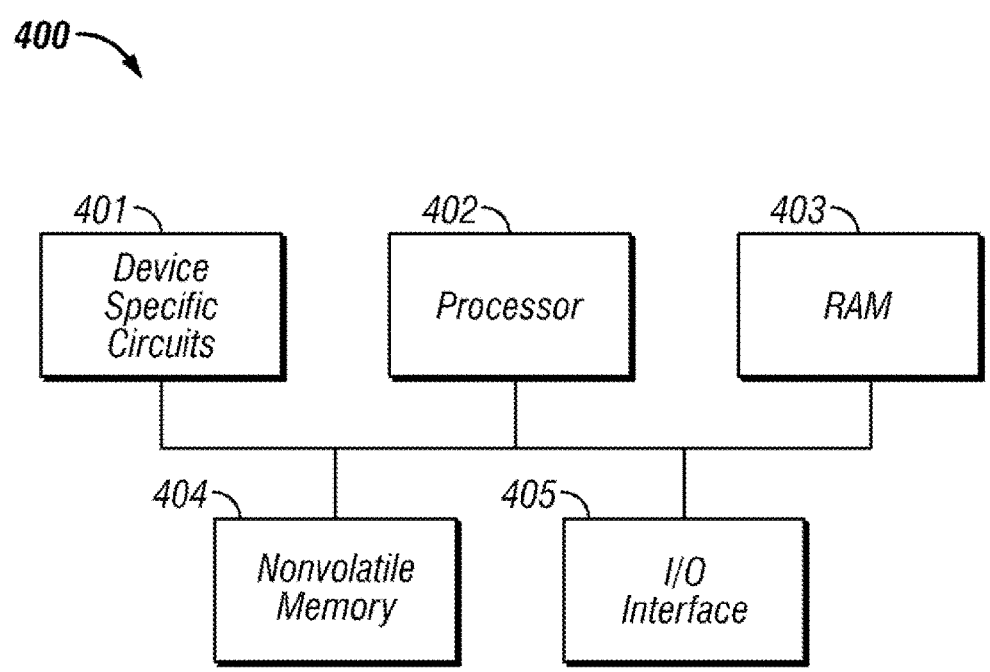
FIG. 4 is a block diagram depicting a controller configuration according to one embodiment.

Referring now to FIG. 4, a typical controller 400 is shown with a processor 402, Random Access Memory (RAM) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, Field Programmable Gate Array (FPGA), Application Specific Integrated Circuit (ASIC), discrete logic, etc. The RAM 403 is typically used to hold variable data, stack data, executable instructions, etc.

According to various approaches, the nonvolatile memory 404 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 404 is typically used to hold the executable firmware and any nonvolatile data. Moreover, the I/O interface 405 comprises a communication interface that allows the processor 402 to communicate with devices external to the controller. Examples may comprise, but are not limited to, serial interfaces such as RS-232, USB (Universal Serial Bus) or Small Computer Systems Interface (SCSI). The device specific circuits 401 provide additional hardware to enable the controller 400 to perform unique functions including, but not limited to, motor control of a cartridge gripper. Moreover, the device specific circuits 401 may include electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the various approaches described and/or suggested herein may be implemented in various automated data storage libraries regardless of control configuration, including, but not limited to, an automated data storage library having one or more library controllers that are not distributed. Moreover, a library controller may comprise one or more dedicated controllers of a library, depending on the desired embodiment. For example, there may be a primary controller and a backup controller. In addition, a library controller may comprise one or more processor nodes of a distributed control system. According to one example, communication processor node 50 (e.g., of FIG. 3) may comprise the library controller while the other processor nodes (if present) may assist the library controller and/or may provide backup or redundant functionality. In another example, communication processor node 50 and work processor node 52 may work cooperatively to form the library controller while the other processor nodes (if present) may assist the library controller and/or may provide backup or redundant functionality. Still further, all of the processor nodes may comprise the library controller. According to various approaches described and/or suggested herein, a library controller may have a single processor or controller, or it may include multiple processors or controllers.

Figure 5A:
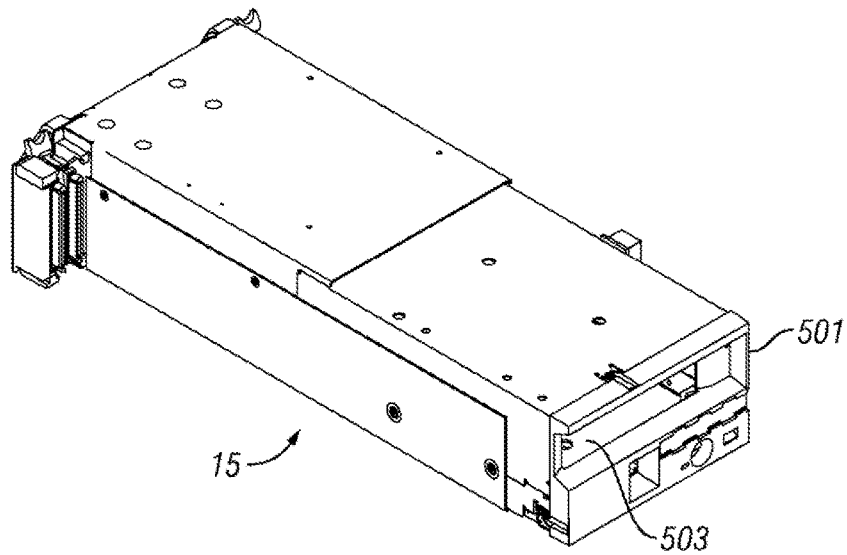
FIG. 5A is a front perspective view of a data storage drive according to one embodiment.
Figure 5B:
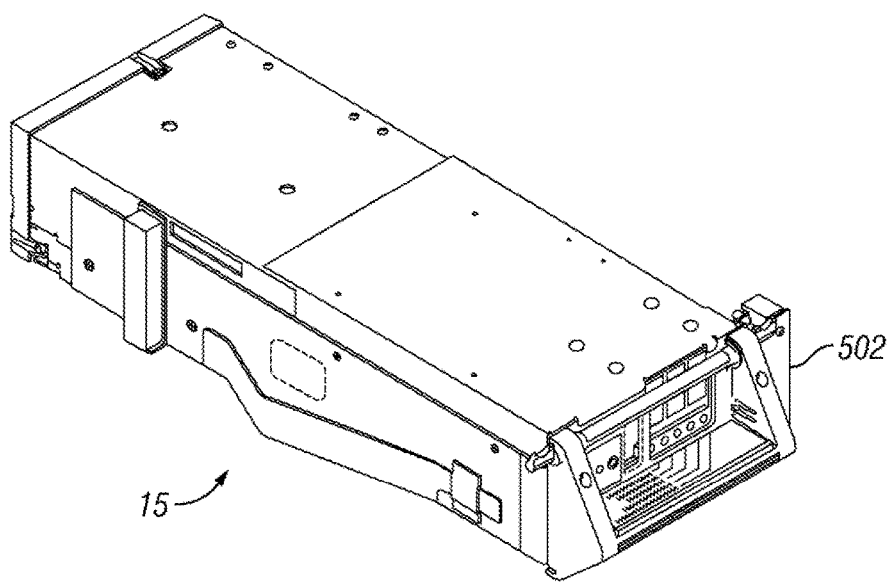
FIG. 5B is a rear perspective view of the data storage drive of FIG. 5A.

FIGS. 5A-5B illustrate the front 501 and rear 502 views of a data storage drive 15, according to one embodiment. In the example depicted in FIGS. 5A-5B, the data storage drive 15 comprises a hot-swap drive canister, which is in no way intended to limit the invention. In fact, any configuration of data storage drive may be used whether or not it includes a hot-swap canister. As discussed above, a data storage drive 15 is used to read and/or write data with respect to the data storage media, and may additionally communicate with a memory which is separate from the media, and is located within the cartridge. Thus, according to one approach, a data storage cartridge may be placed into the data storage drive 15 at opening 503.

Figure 6:
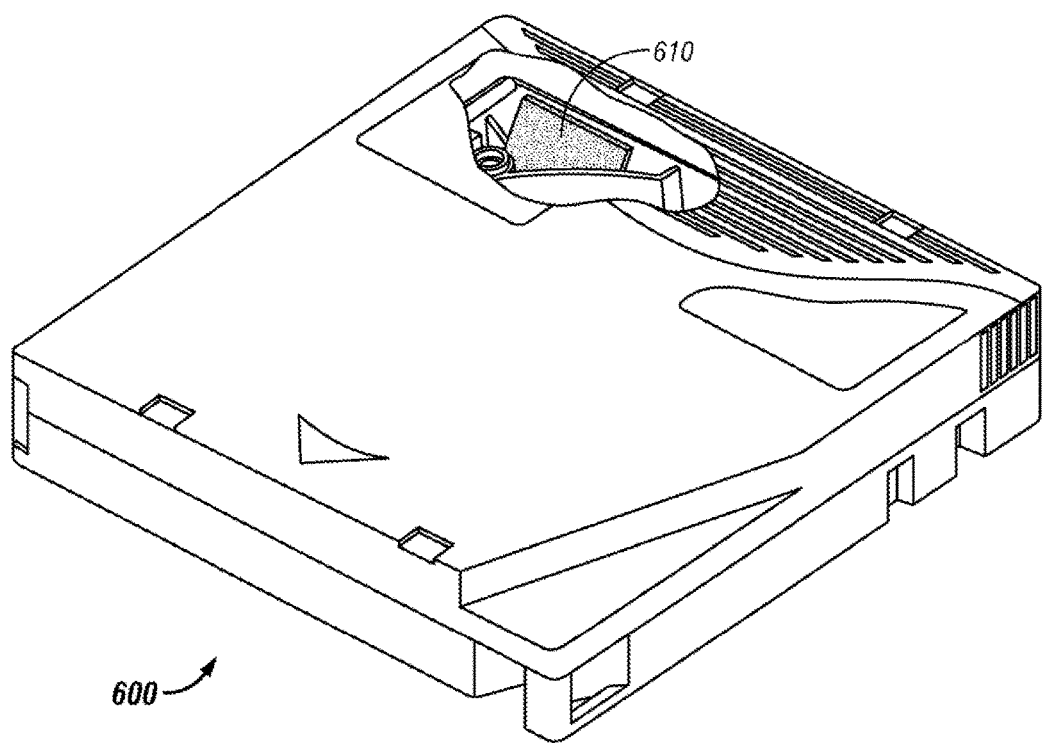
FIG. 6 is perspective view of a data storage cartridge having a cutaway portion, according to one embodiment.

Furthermore, FIG. 6 illustrates an embodiment of a data storage cartridge 600 with a cartridge memory 610 shown in a cutaway portion of the Figure, which is in no way intended to limit the invention. In fact, any configuration of data storage cartridge may be used whether or not it comprises a cartridge memory. According to various approaches, media of the data storage cartridge media may include any type of media on which data may be stored, including but not limited to magnetic media, e.g., magnetic tape, disks, etc.; optical media, e.g., optical tape, disks, etc.; electronic media, e.g., PROM, EEPROM, flash PROM, CompactFlash™, Smartmedia™, Memory Stick™, etc.; etc., or other suitable media. Moreover, an example of a data storage cartridge that is widely employed in automated data storage libraries for mass data storage is a magnetic tape cartridge in which the media is magnetic tape.

Figure 7:
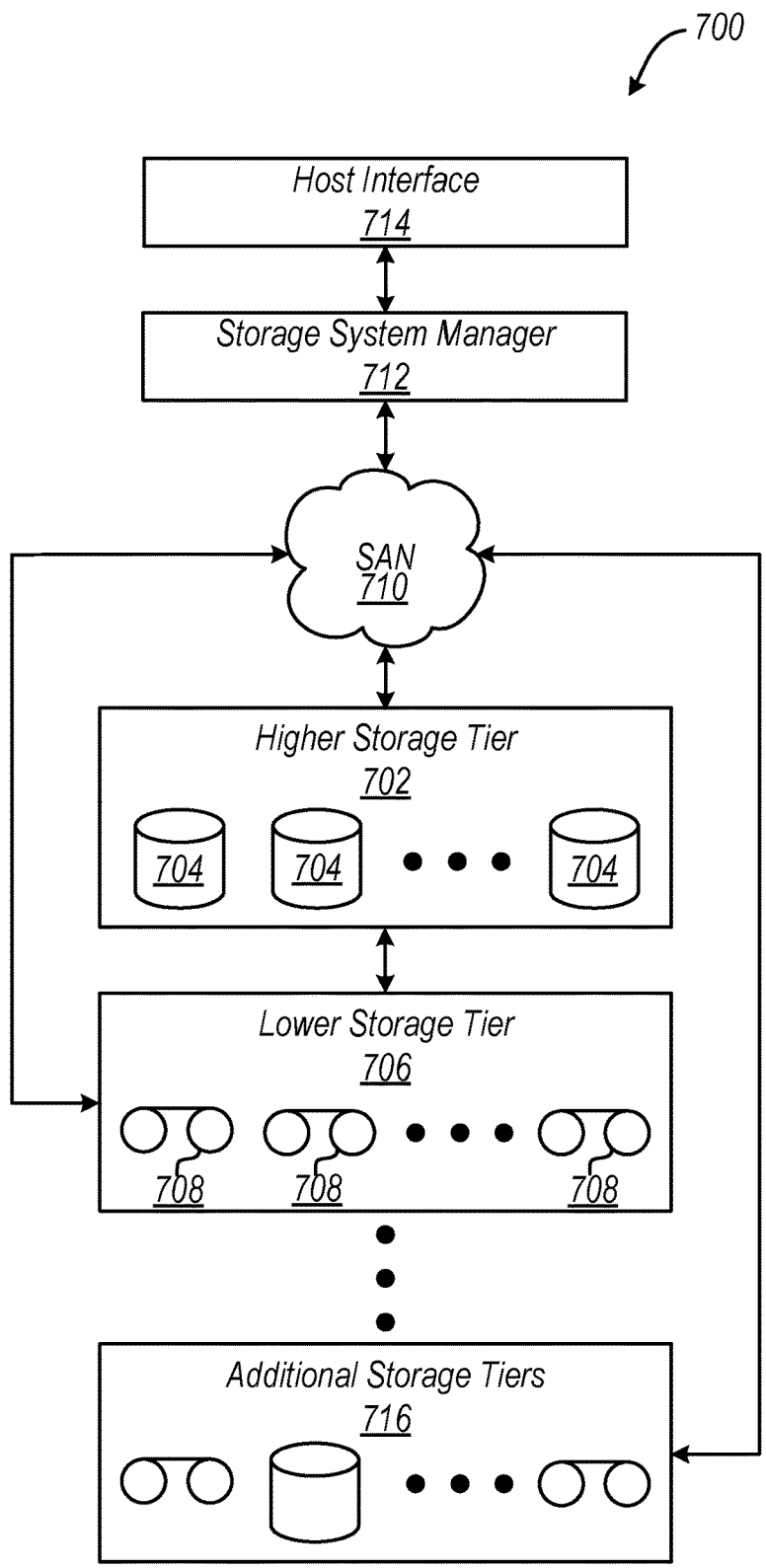
FIG. 7 is a tiered data storage system according to one embodiment.

Now referring to FIG. 7, a storage system 700 is shown according to one embodiment. Note that some of the elements shown in FIG. 7 may be implemented as hardware and/or software, according to various embodiments. In some approaches, the storage system 700 may be implemented in an automated data storage library such as that shown in FIGS. 1-2. In other approaches, an automated data storage library such as that shown in FIGS. 1-2 may be a tier of the storage system 700.

The storage system 700 may include a storage system manager 712 for communicating with a plurality of media on at least one higher storage tier 702 and at least one lower storage tier 706. The higher storage tier(s) 702 preferably may include one or more random access and/or direct access media 704, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 706 may preferably include one or more lower performing storage media 708, including sequential access media such as magnetic tape in tape drives and/or optical media, slower accessing HDDs, slower accessing SSDs, etc., and/or others noted herein or known in the art. One or more additional storage tiers 716 may include any combination of storage memory media as desired by a designer of the system 700. Also, any of the higher storage tiers 702 and/or the lower storage tiers 706 may include some combination of storage devices and/or storage media.

The storage system manager 712 may communicate with the storage media 704, 708 on the higher storage tier(s) 702 and lower storage tier(s) 706 through a network 710, such as a storage area network (SAN), as shown in FIG. 7, or some other suitable network type. The storage system manager 712 may also communicate with one or more host systems (not shown) through a host interface 714, which may or may not be a part of the storage system manager 712. The storage system manager 712 and/or any other component of the storage system 700 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 700 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 702, may include a majority of SSD storage media for storing data in a higher performing storage environment, and remaining storage tiers, including lower storage tier 706 and additional storage tiers 716 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 702, while data not having one of these attributes may be stored to the additional storage tiers 716, including lower storage tier 706. Of course, one of skill in the art, upon reading the present descriptions, may devise many other combinations of storage media types to implement into different storage schemes, according to the embodiments presented herein.

According to some embodiments, the storage system (such as 700) may include logic configured to receive a request to open a data set, logic configured to determine if the requested data set is stored to a lower storage tier 706 of a tiered data storage system 700 in multiple associated portions, logic configured to move each associated portion of the requested data set to a higher storage tier 702 of the tiered data storage system 700, and logic configured to assemble the requested data set on the higher storage tier 702 of the tiered data storage system 700 from the associated portions. Of course, this logic may be implemented as a method on any device and/or system or as a computer program product, according to various embodiments.

As previously mentioned, the amount of time and effort involved with accessing a desired segment of data rises as storage capacity increases. Not only is there more data to sift through in order to find a desired segment of data, but accessing that data, even after it has been located, is increasingly difficult as well. This is particularly true for data stored in linear media such as magnetic tape. Although magnetic tape is a relatively inexpensive storage medium, data access times for magnetic tape is slower than for other media types.

In sharp contrast, various embodiments described herein may be able to reduce the amount of time associated with accessing data from tape. Moreover, data redundancy may also be achieved by various embodiments included herein, thereby also safeguarding against data loss.

Figure 8:
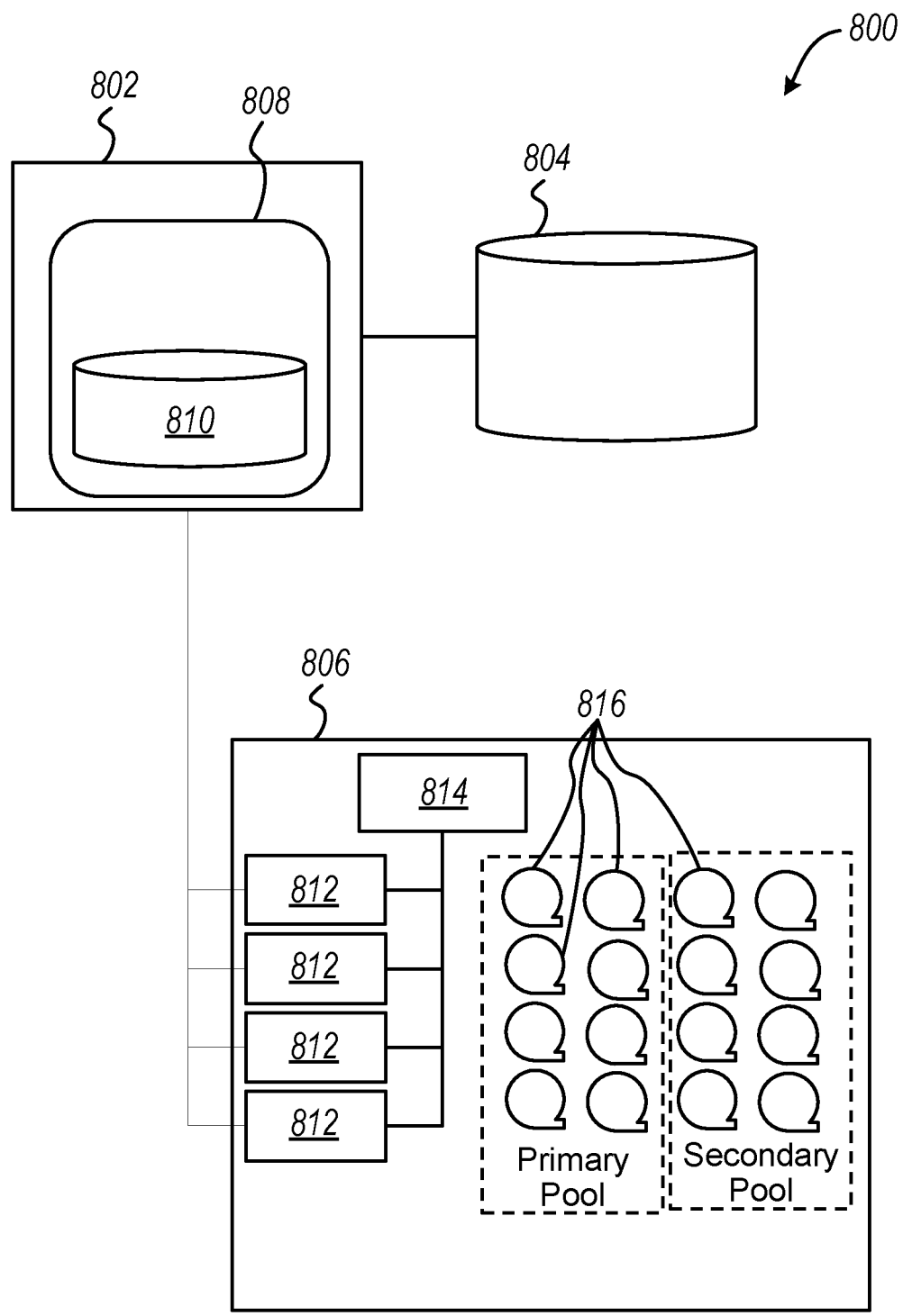
FIG. 8 is a block diagram of a data storage system according to one embodiment.

Referring momentarily to FIG. 8, a tape storage system 800 is illustrated in accordance with one embodiment. As an option, the present system 800 may be implemented in conjunction with features from any other embodiment listed herein, such as those described with reference to the other FIGS. However, such system 800 and others presented herein may be used in various applications and/or in permutations which may or may not be specifically described in the illustrative embodiments listed herein. Further, the system 800 presented herein may be used in any desired environment. Thus FIG. 8 (and the other FIGS.) may be deemed to include any possible permutation.

As shown, tape storage system 800 includes a host location 802 which is coupled to a disk based storage location 804 and a tape library 806, e.g., which may include any of the features described with reference to FIGS. 1-6. The host location 802 in the present embodiment includes a tape application 808 having a tracking database 810. In some approaches, tape application 808 may be used to control the tape library 806, e.g., transfer and/or access data stored in the tape library 806. For example, the tape application 808 may record the location of data on tape cartridges into the tracking database 810. Moreover, in some approaches, the tracking database 810 may be used to implement any one or more of the processes included below in method 900 and/or 1400.

Moreover, tape library 806 includes tape drives 812 which are coupled to medium changer 814, which may be an accessor (e.g., see accessor 18 of FIG. 1). Each of the tape drives 812 preferably include a tape head which is able to write data to and/or read data from the tape stored in a tape cartridge 816 when positioned in one of the tape drives 812. Medium changer 814 may be used to coordinate which tape cartridge 816 is in each of the tape drives 812, e.g., according to instructions received from the host location 802 and/or a controller of the tape library 806. Furthermore, tape cartridges 816 are stored collectively in pools, which may be physical pools, but are preferably logical pools. According to the present embodiment, system 800 is shown as having a primary pool and a secondary pool which may be used to classify the tape cartridges 816 according to any desired storage configuration. Moreover, the tape application 808 may be used to manage the primary and secondary pools.

In a preferred approach, data is replicated such that one copy thereof resides on a cartridge in the primary pool while another copy of the data resides on a cartridge in the secondary pool. This provides data redundancy for such things as disaster recovery. However, pools may be provided, and tape allocated thereto, for any desired purpose.

According to some approaches, the tape library 806 may be used to store data received from the disk based storage location 804. In other words, the tape library 806 may be used to archive data formerly stored at the disk based storage location 804. According to one example, which is in no way intended to limit the invention, as data stored on the disk based storage location 804 becomes "colder" (e.g., has an access and/or update rate slower than "hot" data), the host location 802 may decide to transfer such data to the tape library 806 for archival storage, e.g., to make room at the disk based storage location 804 for "hotter" data.

Figure 9:
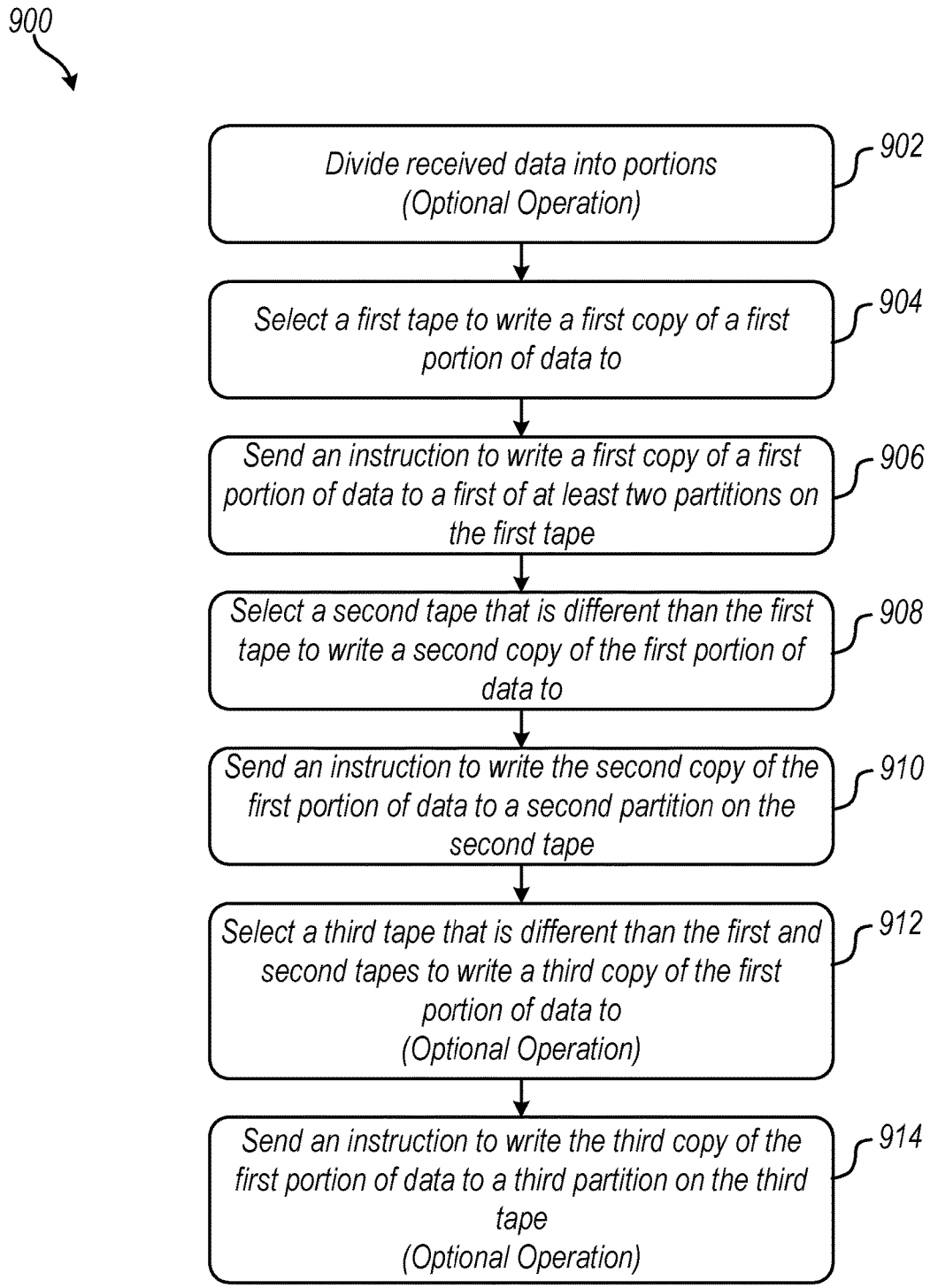
FIG. 9 is a flowchart of a method according to one embodiment.

Looking to FIG. 9, a method 900 includes an improved process for writing data in accordance with one embodiment. As an option, the present method 900 may be implemented in conjunction with features from any other embodiment listed herein, such as those described with reference to the other FIGS., such as FIG. 8. However, such method 900 and others presented herein may be used in various applications and/or in permutations which may or may not be specifically described in the illustrative embodiments listed herein. Further, the method 900 presented herein may be used in any desired environment. Thus FIG. 9 (and the other FIGS.) may be deemed to include any possible permutation.

Again, method 900 includes a process for writing data that may be used to reduce the amount of time associated with accessing particular data from tape (e.g., see method 1400 below). As data to be written to tape is received, it may be partitioned into portions before being written out to tape. Accordingly, optional operation 902 includes dividing received data into portions. The characteristics of the portions themselves may be determined based on predetermined and/or dynamically-determined criteria, such as size (e.g., each potion having a certain amount of data therein), a temperature of the data (e.g., hot data that is accessed more frequently v. cold data that is accessed less frequently), an amount of data received, user preference, etc., depending on the desired embodiment.

Once the data has been divided into portions, operation 904 of method 900 includes selecting a first tape to write a first copy of a first portion of data to. Moreover, operation 906 includes sending an instruction to write a first copy of a first portion of data to a first of at least two partitions on the first tape. It is preferred that the first tape selected is one that is already positioned in a tape drive. As mentioned above, a tape drive may include a tape head which is able to write data to and/or read data from the tape of a tape cartridge when the tape cartridge itself is mounted in one of the tape drives. Thus, by selecting a first tape in operation 904 which is already positioned in a tape drive, the amount of time to perform operations 904 and 906 may desirably be reduced. However, the selected first tape may be any one of the tapes included in a given tape library.

Figure 10:
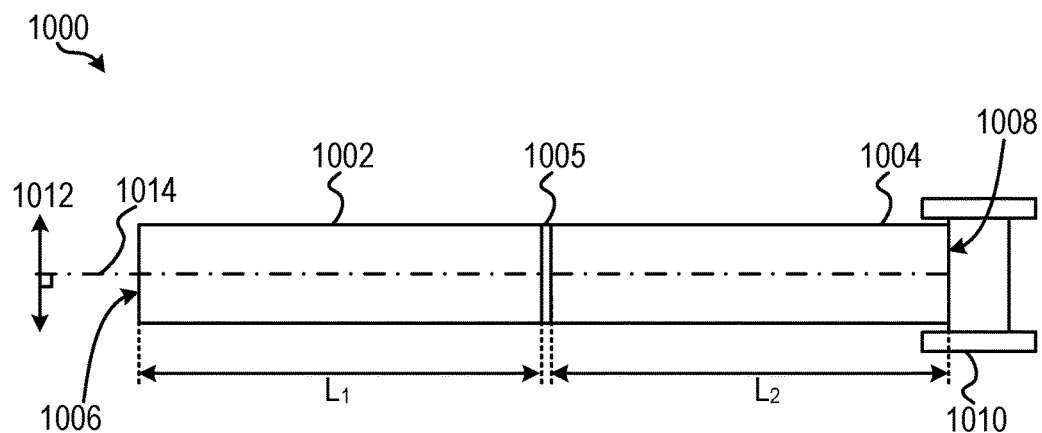
FIG. 10 is a tape having two partitions according to one embodiment.

As alluded to above, the first tape preferably has at least a first partition and a second partition, and optionally one or more additional partitions. It is also preferred, but in no way required, that all tapes included in a tape library from which the selection of operation 904 is performed have at least a first and second partition. Referring momentarily to FIG. 10, a representation of a tape 1000 is depicted as having two physical partitions, namely a first partition 1002 and a second partition 1004 separated by a guard gap 1005, according to an illustrative embodiment. First and second partitions 1002, 1004 may be achieved by modifying the internal formatting indicators of the tape itself and/or in a cartridge memory (e.g., see 610 of FIG. 6), and writing separately to each partition on the corresponding side of the guard gap 1005, which prevents overwriting of data from one partition to the other. However, any other process of achieving segmentation along the tape which would be apparent to one skilled in the art upon reading the present description may be used. For instance, a function of performance scaling (e.g., capacity scaling) may be used to contain data in specified fractions (partitions) of the tape.

Figure 12:
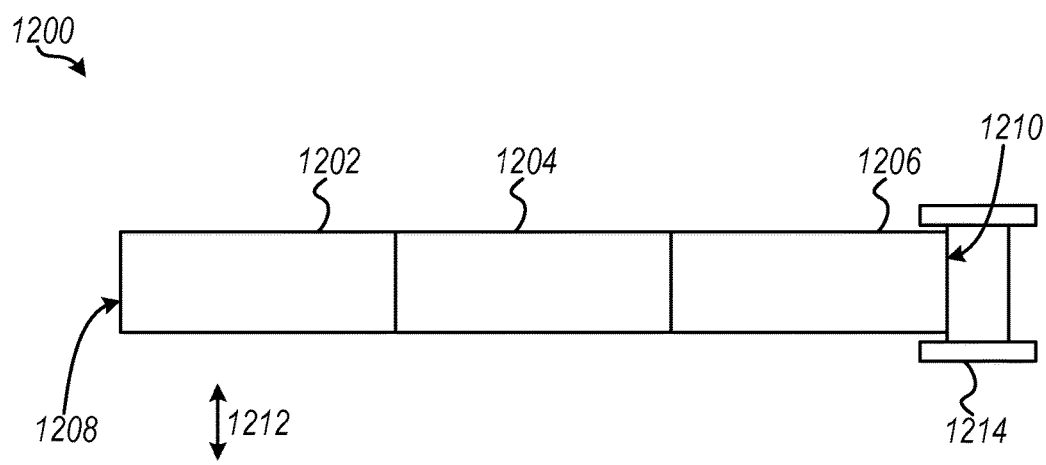
FIG. 12 is a tape having three partitions according to one embodiment.
Figure 13:
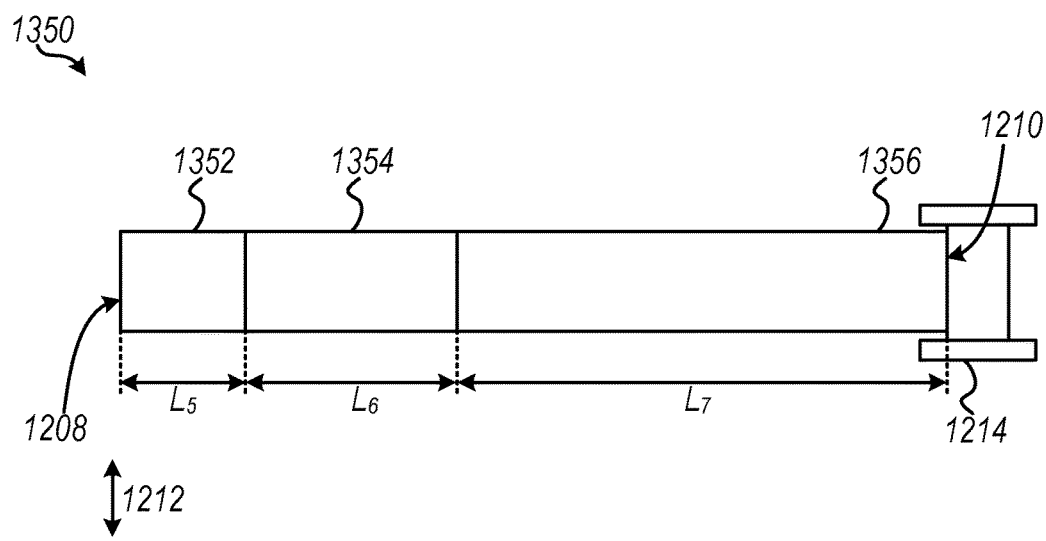
FIG. 13 is a tape having three partitions according to one embodiment.

As shown, the first partition 1002 on the tape 1000 is closer to a beginning of tape (BOT) 1006 than the second partition 1004. Moreover, the second partition 1004 is closer to an end of tape (EOT) 1008 than the first partition 1002. It follows that the BOT 1006 is located at an opposite end of the tape 1000 than the EOT 1008. The BOT 1006 may be identified as the portion of the tape that is first threaded through a tape drive from a cartridge that is loaded in the tape drive, while the EOT 1008 may be identified as the opposite end of tape, e.g., the end that remains fixed to the tape reel 1010 in the cartridge (not shown), as would be appreciated by one skilled in the art upon reading the present description. It should be noted that although tape 1000 is shown as having two partitions 1002, 1004, tapes may include additional partitions in other embodiments, e.g., as shown in FIGS. 12-13 below.

In use, data may be written to and read from the first partition 1002 using conventional techniques. Data may also be written to and read from the second portion 1004. Thus, each partition may be treated effectively as a separate tape, whereby a tape wrap for a given partition extends between the respective end region (BOT or EOT) of the tape to the guard gap 1005.

Data stored in the first partition 1002 may be accessed more quickly than data stored in the second partition 1004 because the data stored in the first partition 1002 is located closer to the BOT 1006. Accordingly, the data stored in the first partition 1002 may be accessed by unrolling a lesser amount of tape from the reel than to access data stored in the second partition 1004 which is located farther from the BOT 1006. Accordingly, read requests may be performed according to a hierarchy which outlines the access times associated with reading data in different locations within a tape library, as will be described in further detail below (e.g., see FIG. 14 and Table 1 below).

The first and second partitions 1002, 1004 illustrated in FIG. 10 have about equal dimensions. For example, the first and second partitions 1002, 1004 have lengths $L_1$, $L_2$ measured along a longitudinal axis 1014 of the tape 1000 which are about equal. However, the lengths of each partition may be set to any desired value. Particularly, although the two or more partitions included on each of the tapes in a tape library may each have about equal dimensions (e.g., width, length, etc.), in some approaches, the dimensions of the partitions included on a given tape may differ. Looking to FIG. 11, the partitions 1152, 1154 have different lengths $L_3$, $L_4$ measured along a longitudinal axis 1014 of the tape 1150 which is perpendicular to the cross-track direction 1012. Specifically, the length $L_3$ of the first partition 1152 is shorter than the length $L_4$ of the second partition 1154. It follows that because the lengths $L_3$, $L_4$ of the partitions 1152, 1154 are different, each of the partitions 1152, 1154 may be able to store different amounts of data therein. For instance, the first partition 1152 may be able to store about 60 GB of data, while the second partition 1154 may be able to store about 200 GB of data. By reducing $L_3$ and thereby the amount of tape available to store data in the first partition 1152 compared to the second partition 1154, the second partition 1154 is consequently able to store more data than the first partition 1152 is able to. In some approaches, the data capacity of the first partition 1152 may be reduced while the data capacity of the second partition 1154 may be increased in order to further reduce the access time associated with reading data from the first partition 1152. As the first partition 1152 is shifted closer towards the BOT, the time to access data stored therein may be even further reduced, particularly in view of the second partition 1154.

Figure 11:
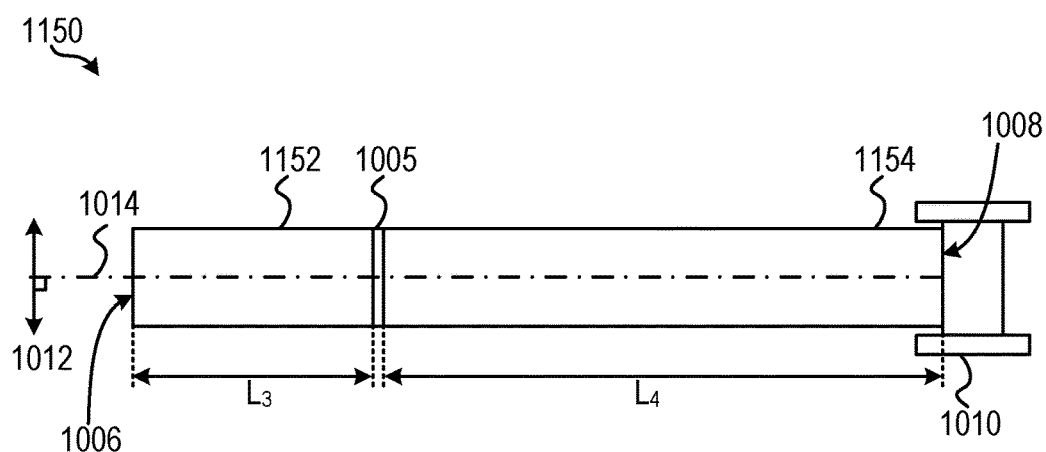
FIG. 11 is a tape having two partitions according to one embodiment.

It follows that the dimensions of the partitions included on a given tape may be adjusted according to the desired embodiment. In some embodiments, the dimensions of the partitions included on each tape in a library may be about equal. However, in other embodiments the dimensions of the partitions included on each respective tape in a library may vary (e.g., as shown in FIG. 11), or the dimensions of the partitions may vary between each of the tapes in the library.

Referring again to method 900, implementing data redundancy is desirable in order to prevent total data loss, e.g., in the event that a first copy of the data is deleted, overwritten, corrupted, etc. Accordingly, operation 908 includes selecting a second tape that is different than the first tape to write a second copy of the first portion of data to. By writing a second copy of the first portion of data to a different tape than the first tape where the first copy of the first portion of data is stored, greater redundancy is achieved than if the first and second copies of the first portion of data were written to the same tape. Accordingly, if one of the tapes having the first copy of the first portion of data is temporarily, permanently, etc., unavailable, then the other tape having the second copy of the first portion of data may be used to provide access to the data.

Any desired criteria may be used to select the second tape.

As previously mentioned, it is preferred that the second tape selected is one that is already loaded in a tape drive to reduce the amount of time to write the second copy of the first portion of data. According to one approach, a tape library may have multiple tape drives (e.g., as seen in FIG. 10). Thus, operation 904 may include selecting a tape in one of the tape drives, while operation 908 includes selecting a different tape in a different one of the tape drives. However, again the selected second tape may be any one of the tapes included in a given tape library, whether loaded in a drive or not.

Moreover, it should be noted that the first and/or second tapes are preferably selected in a pseudo-random manner. In other words, the manner by which the first and/or second tapes are selected to have the respective first and second copies of the first portion of data stored thereon is done pseudo-randomly. Thus, as subsequent portions of data are stored in tapes included in a tape library using the operations of method 900, the portions of data may be about evenly distributed among the tapes included in the library, because implementing a pseudo-random selection process may achieve an about even distribution of portions of data across the library as would be appreciated by one skilled in the art upon reading the present description.

With continued reference to FIG. 9, operation 910 includes sending an instruction to write the second copy of the first portion of data to a second partition on the second tape. Like the first tape, the second tape preferably has at least a first partition and a second partition, e.g., as shown in FIGS. 10-11 above. Moreover, it follows that tape drives which are able to implement such data redundancy on partitioned tapes, while also tracking the physical data location on each of the tapes are preferred, e.g., such as IBM TS1150 tape drives, which may be implemented with any of the embodiments described herein.

In some embodiments, a tape may have even more than two partitions. Looking to FIGS. 12-13, tapes 1200, 1350 are shown as having three partitions. In FIG. 12, tape 1200 has first, second and third partitions 1202, 1204, 1206 respectively. The first partition 1202 on the tape 1200 is closer to the BOT 1208 than the second and third partitions 1204, 1206, while the second partition 1204 is closer to the BOT 1208 than the third partition 1206. Moreover, the third partition 1206 is closer to the EOT 1210 than the first and second partitions 1202, 1204, while the second partition 1204 is closer to the EOT than the first partition 1202.

Again, the BOT 1208 may be identified as the end of the tape that is first threaded through a tape drive from a cartridge that is loaded in the tape drive, while the EOT 1210 may be identified as the other end of the tape, e.g., that remains fixed to the tape reel 1214 in the cartridge (not shown), as would be appreciated by one skilled in the art upon reading the present description. It follows that data stored in the first partition 1202 may be accessed more quickly than data accessed in the second or third partitions 1204, 1206, while data stored in the second partition 1204 may be accessed more quickly than data stored in the third partition 1206. Moreover, the first, second and third partitions 1352, 1354, 1356 of tape 1350 in FIG. 13 are shown as having different lengths $L_5$, $L_6$, $L_7$ respectively, according to one embodiment.

Accordingly, in some approaches, a third copy of a portion of data may be stored to one of the partitions on a third tape, e.g., for added redundancy. Thus, a third copy of a portion of data may be recovered despite the first and second copies being corrupted, deleted, overwritten, etc. According to an example, a user may choose to make a third copy of particularly important data in order to reduce the chance of losing the data.

Returning to method 900, optional operation 912 includes selecting a third tape that is different than the first and second tapes to write a third copy of the first portion of data to. As previously mentioned, the third tape may be chosen in a pseudo-random manner. However, it is preferred that the third tape is already positioned in a drive. Therefore, in some approaches the tapes already positioned in drives may be given preference over those located elsewhere in a tape library (e.g., in storage slots). Moreover, it is again preferred that the third tape is a different tape than the first and second tapes. Alternatively, if the third copy of the first data portion were written to a third partition of the first or second tape selected in operations 904, 908 respectively, the portion of data would not be afforded additional redundancy.

Furthermore, optional operation 914 includes sending an instruction to write the third copy of the first portion of data to a third partition on the third tape. It should be noted that the operations of method 900 are in no way intended to limit the order in which copies of a portion of data is stored on tape. For instance, a first copy of a first portion of data may first be stored in a third partition of a different tape, while a second copy of the first portion of data may be stored on a first partition of a given tape, and a third copy of the first portion of data may be stored on a second partition of yet another tape, or any combination thereof depending on the desired embodiment. Moreover, it should also be noted that second, third, etc. copies of a given portion of data may be stored on partitions of different tapes despite the tape having the first copy of the portion of data being ejected from a tape drive. As a tape, or portions thereof, are filled, the tape may be ejected from a tape drive in order to load a different tape to use for performing subsequent write operations and/or a read operation as would be appreciated by one skilled in the art upon reading the present description.

As described above, data stored in different partitions of tape may have different access times associated therewith. For instance, data stored in a first partition may be accessed more quickly than data stored in a second partition or a third partition because the data stored in the first partition is located closer to the BOT. Accordingly, the data stored in the first partition may be accessed by unrolling a lesser amount of tape from the reel than to access data stored in the second and third partitions which are located farther from the BOT. Moreover, data stored in the second partition may be accessed more quickly than data stored in the third partition for similar reasons.

It follows that when a read request is received for a given portion of data that is stored in more than one location (e.g., there are redundant copies) in a tape library, where the data is read from may have an effect on the amount of time it takes to successfully perform the read request. Accordingly, read requests may be performed according to a hierarchy which incorporates the different access times associated with reading data that is stored in different locations within a tape library as well as the present location of a given tape in the tape library.

Looking to Table 1, the relative data access times corresponding to each partition of a three-partition tape depending on whether the tape is located in a tape drive or not are presented.

TABLE 1

|  | Loaded in Tape Drive | Not Loaded in Tape Drive |
| --- | --- | --- |
| First Partition | Fastest | Slow |
| Second Partition | Faster | Slower |
| Third Partition | Fast | Slowest |

As shown, data access times for a tape having first, second and third partitions (e.g., as shown in FIG. 12) which is already loaded in a tape drive is shorter than data access times for a three-partition tape positioned elsewhere in a storage library (e.g., in a storage slot). Moreover, data located in the first partition has a faster data access time than data located in the second or third partitions because the first partition is positioned closer to the BOT, as previously described. Thus, it is preferred that read requests are performed using tapes already located in tape drives, while tapes not already located in a tape drive may be used should the requested data not be located in a tape already loaded in a tape drive.

Figure 14:
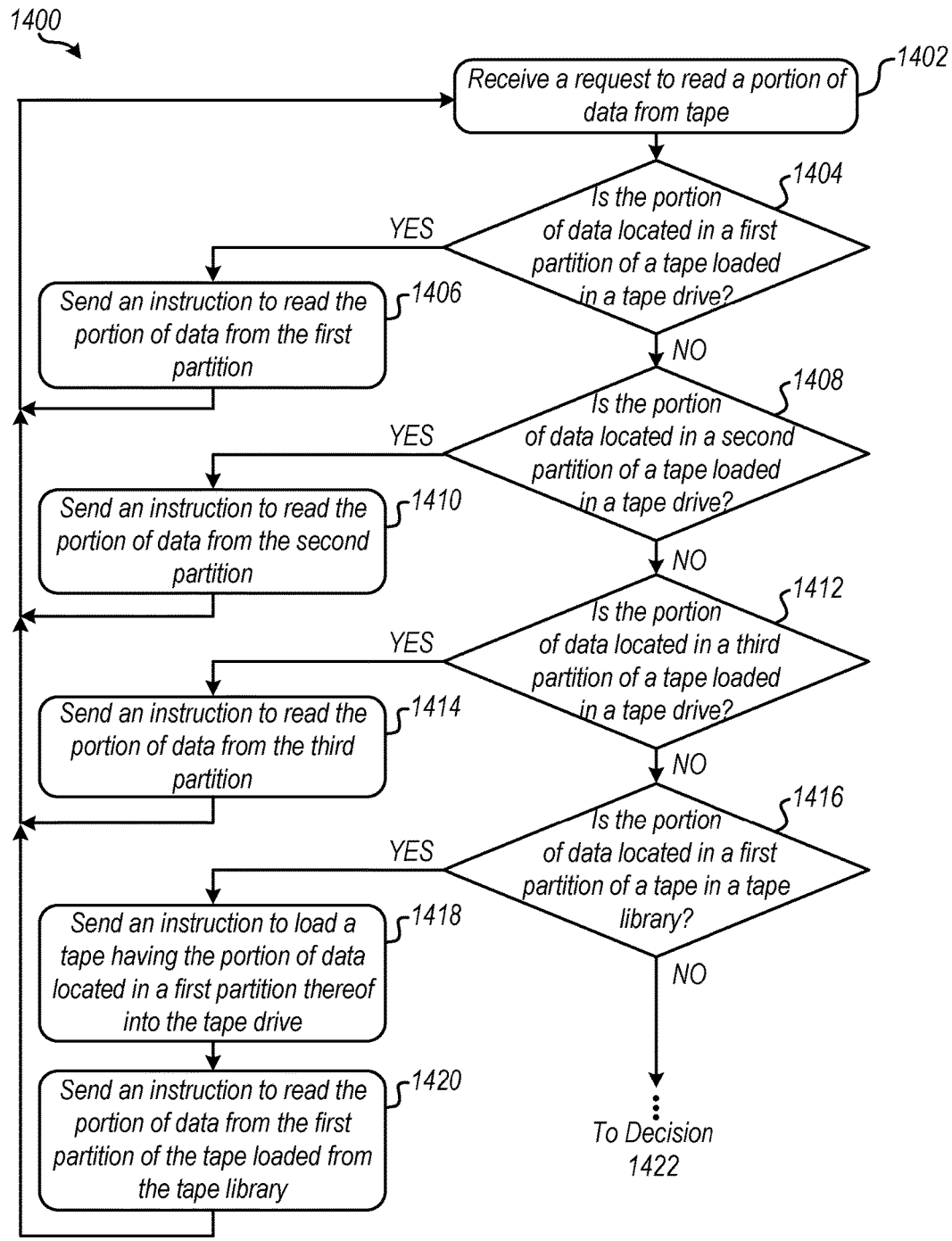
FIG. 14 is a flowchart of a method according to one embodiment.
Figure 14:
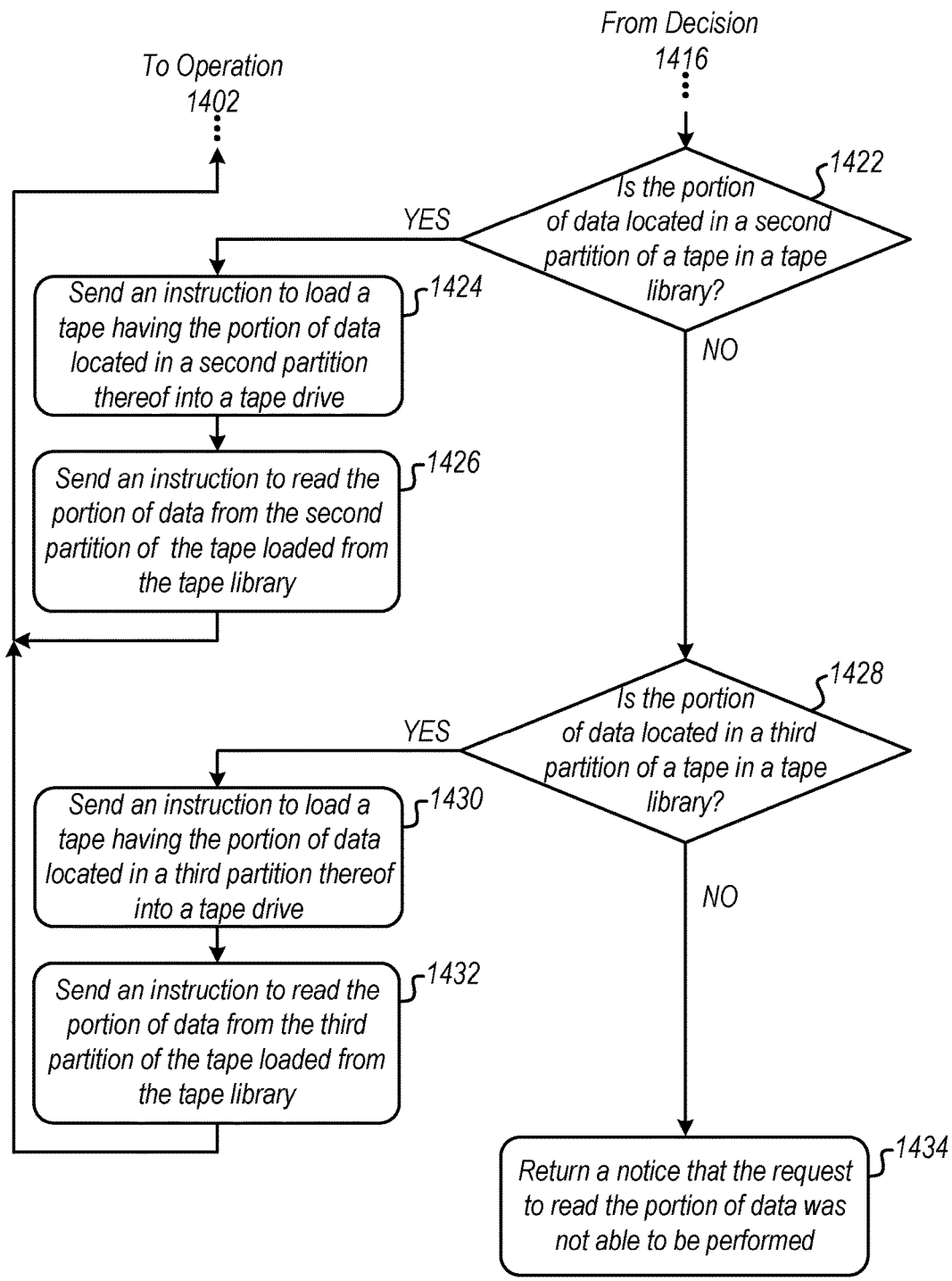

Now referring to FIG. 14, a flowchart of a computer-implemented method 1400 for performing a read request is shown according to one embodiment. The method 1400 may be performed in accordance with the present invention in any of the environments depicted in FIGS. 1-13 and Table 1, among others, in various embodiments. Of course, more or less operations than those specifically described in FIG. 14 may be included in method 1400, as would be understood by one of skill in the art upon reading the present descriptions.

Each of the steps of the method 1400 may be performed by any suitable component of the operating environment. For example, in various embodiments, the method 1400 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 14, operation 1402 of method 1400 includes receiving a request to read a portion of data from tape. The request may be received from a user, a host location (e.g., see 1002 of FIG. 10), a different data-storage tier itself, etc., depending on the embodiment.

After receiving the read request, method 1400 proceeds to decision 1404 which includes determining whether the portion of data is located in a first partition of a tape loaded in a tape drive. Referring back to Table 1, data stored in the first partition of a tape already located (e.g., loaded) in a tape drive has the fastest access time compared to other partitions and/or tapes in a library not already located in a tape drive. Therefore, it is desirable that method 1400 first determines whether the data corresponding to a read request is located in a first partition of a tape loaded in a tape drive. Moreover, it should be noted that an embodiment may include more than one tape drive. For example, FIG. 12 includes several tape drives. Accordingly, decision 1404 may involve determining whether the requested portion of data is located in a first partition of any one of the tapes located in any one of the tape drives in a given tape library.

As shown, method 1400 proceeds to operation 1406 in response to determining that the portion of data is located in the first partition of any one of the tapes located in any one of the tape drives in a given tape library. Operation 1406 includes sending an instruction to read the portion of data from the first partition.

Alternatively, decision 1408 is performed in response to determining that the portion of data is not located in the first partition of any one of the tapes located in any one of the tape drives in a given tape library. Decision 1408 includes determining whether the portion of data is located in a second partition of any one of the tapes located in any one of the tape drives in a given tape library. Again, Table 1 outlines that data stored in the second partition of a tape already located (e.g., loaded) in a tape drive has a faster access time compared to other tapes not located in a tape drive already. This is at least partially due to the fact that accessing data on a tape not already loaded in a tape drive involves accessing the tape, loading it in a drive, and then locating the data, thereby increasing the data access time.

Operation 1410 includes sending an instruction to read the portion of data from the second partition in response to determining that the portion of data is located in the second partition of any one of the tapes located in any one of the tape drives in a given tape library. However, method 1400 alternatively progresses to decision 1412 in response to determining that the portion of data is not located in the second partition of any one of the tapes located in any one of the tape drives in a given tape library. Then, decision 1412 includes determining whether the portion of data is located in a third partition of any one of the tapes located in any one of the tape drives in a given tape library.

Operation 1414 sends an instruction to read the portion of data from the third partition in response to determining that the portion of data is located in the third partition of any one of the tapes located in any one of the tape drives in a given tape library.

Further operations may be performed to determine if any partition of a tape loaded in a drive has the desired portion of data, and if so, that data is used. If not, the method proceeds to decision 1416. As shown, decision 1416 includes determining whether the portion of data is located in a first partition of a tape in a tape library. Again, Table 1 illustrates that if a portion of data is not located in a tape already located (e.g., loaded) in a tape drive, the next lowest data access time is provided by selecting a tape having the data in the first partition, where the tape is in a storage location of the tape library.

Accordingly, an instruction to load a tape having the portion of data located in a first partition thereof into the tape drive is sent in response to determining that the portion of data is located in the first partition of the tape in the tape library. See operation 1418. Moreover, operation 1420 includes sending an instruction to read the portion of data from the first partition of the tape loaded from the tape library.

Returning to decision 1416, method 1400 proceeds to decision 1422 in response to determining that the portion of data is not located in the first partition of any one of the tapes in the tape library. There, decision 1422 includes determining whether the portion of data is located in a second partition of any one of the tapes in the tape library. An instruction to load a tape having the portion of data located in a second partition thereof into a tape drive is sent in response to determining that the portion of data is located in the second partition of any one of the tapes in the tape library. See operation 1424. Furthermore, operation 1426 includes sending an instruction to read the portion of data from the second partition of the tape loaded from the tape library.

Should it be determined that the portion of data is not located in the second partition of any one of the tapes in the tape library, method 1400 continues on to decision 1428 which determines whether the portion of data is located in a third partition (or any other partition) of any one of the tapes in the tape library. Moreover, operation 1430 includes sending an instruction to load a tape having the portion of data located in a third (or other) partition thereof into a tape drive in response to determining that the portion of data is located in the third partition of any one of the tapes in the tape library. Furthermore, operation 1432 includes sending an instruction to read the portion of data from the third (or other) partition of the tape loaded from the tape library.

Returning to decision 1428, method 1400 is illustrated as proceeding to operation 1434 in response to determining that the portion of data is located in the third partition of any one of the tapes in the tape library. According to one approach, operation 1434 may include returning a notice that the read request was not able to be performed. According to another approach, operation 1434 may inform a host that the requested portion of data was not found in the tape library, e.g., so it may be searched for elsewhere such as in a disk based storage location, a remote data repository, etc.

As alluded to above, should any of the tapes included in the tape library include any additional partitions (e.g., a fourth partition, a fifth partition, etc.), method 1400 may further include determining whether the requested portion of data is located in any of the additional partitions before returning a failed read request notice.

It should also be noted that method 1400 is shown returning to operation 1402 in response to sending an instruction to read the portion of data from the partition in which it was found. As a result, method 1400 may wait to receive a subsequent read request, but is in no way limited thereto.

Figure 15:
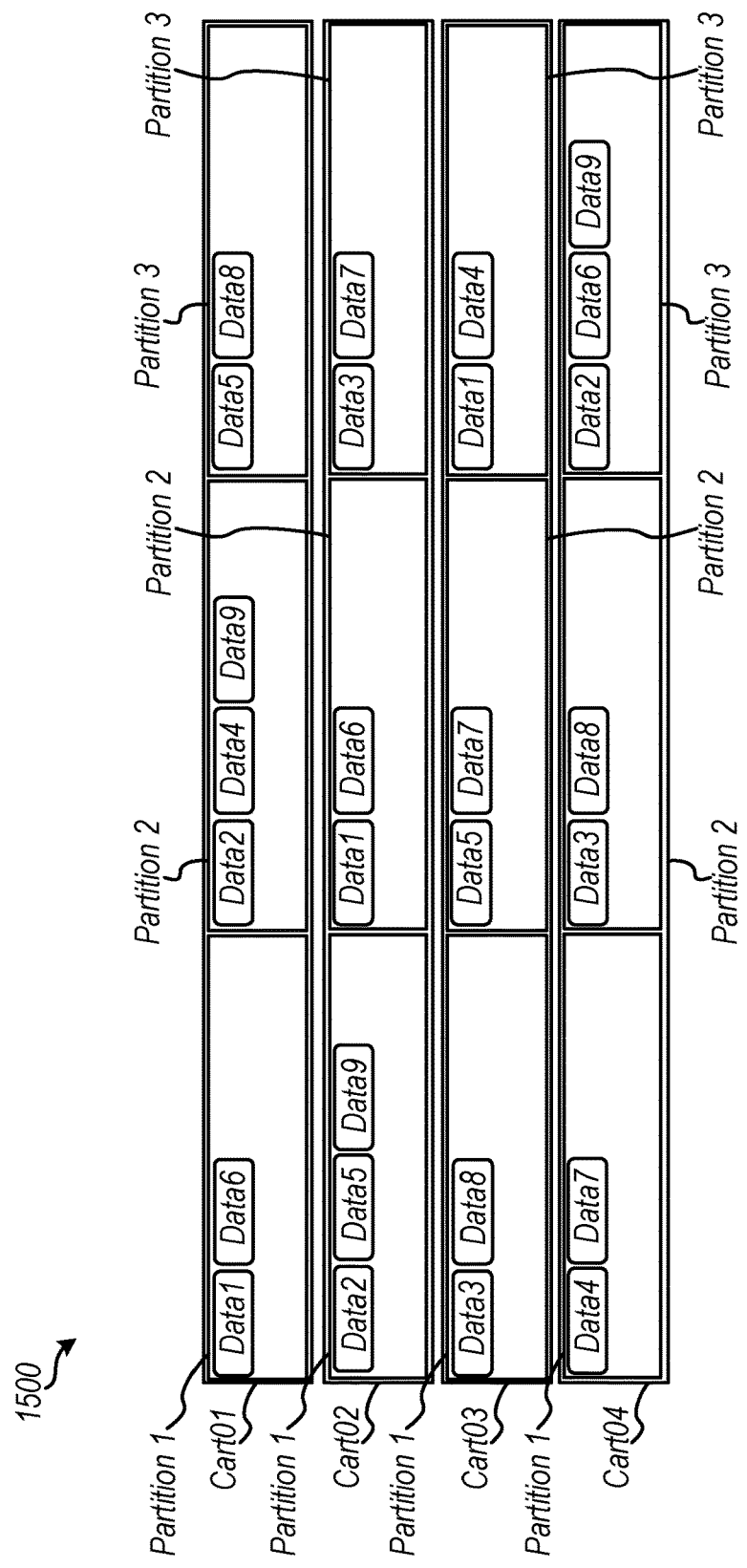
FIG. 15 is a representative diagram of storing portions of data on a tape having three partitions according to one embodiment.

Referring now to FIG. 15, a representative diagram 1500 of an in-use embodiment is provided, which is in no way intended to limit the invention, but rather is provided by way of example only. As shown, a copy of each portion of data is located in each of the three partitions. For example, a first copy of the first portion of data Data 1 is located in the first partition Partition 1 of the first tape in cartridge 01 Cart01, while a second copy of the first portion of data Data 1 is located in the second partition Partition 2 of the second tape in cartridge 02 Cart02 and the third copy of the first portion of data Data 1 is located in the third partition Partition 3 of the third tape in cartridge 03 Cart03.

However, the tape on which each copy of the data portion is stored is preferably selected in a pseudo-random manner. Thus, the number of the copy and tape on which it is stored may not have a linear relationship as seen in the previous example. According to another example, a first copy of the second portion of data Data 2 is located in the first partition Partition 1 of the second tape Cart02, while a second copy of the second portion of data Data 2 is located in the second partition Partition 2 of the first tape Cart01 and the third copy of the second portion of data Data 2 is located in the third partition Partition 3 of the fourth tape in cartridge 04 Cart04.

Although the in-use embodiment of FIG. 15 shows data written to each of the three partitions in each of the tapes even though none of the partitions themselves have been filled, it should be noted that it is preferred that the first partition on a given tape is written in full before any data is written to any subsequent partition of the given tape. Thus, in some approaches a tape may not be selectable to have a portion of data written to a second, third, etc. partition thereof before the leading partitions are filled. According to an example, a tape with only a partially filled first partition may not be selected to have a copy of a given data portion written to the third partition thereof. However, after the first and second partitions have been written in full, the tape may be selected to have a copy of a given data portion written to the third partition thereof.

In some approaches, one or more portions of data may be assigned to a given partition of a given tape but not actually written until later. The assigned data may be stored in memory and the write thereof performed at a later time, e.g., when the target tape becomes loaded and mounted in a drive. According to an example, which is in no way intended to limit the invention, a tape may be pseudo-randomly selected to store a copy of a portion of data in a second partition of the tape. However, the first partition of the tape may not yet be filled, thereby preventing data from actually being written to the second partition of the tape when selected. Accordingly, the operation of writing the portion of data to the second partition may be queued in memory, e.g., to actually be performed after the first partition of the tape is written in full, thereby allowing data to be written to the second partition of the tape.

It follows that various embodiments described herein may be able to reduce the amount of time associated with accessing data from tape by implementing improved processes of writing data thereto and/or reading data therefrom.

Tape access times are typically faster if the location of data is close to the BOT (at least compared to data closer to the EOT), particularly on single reel tape cartridges. However, most conventional storage systems are not aware of the tape position where particular data has been written to because of its difficulty to implement and maintain. In sharp contrast, the various embodiments described and suggested herein may be able to achieve "partition-aware" embodiments which are able to select tape cartridges for writing copies of a given portion of data in different partitions on specific regions of the tape. Moreover, as mentioned above, it is preferred that tape drives and/or tape applications which support the longitudinal partitioning as described herein are used.

Moreover, data redundancy may also be achieved by the embodiments included herein, thereby also providing added safeguards against data loss.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

A data processing system suitable for storing and/or executing program code may include at least one processor, which may be or be part of a controller, coupled directly or indirectly to memory elements through a system bus, such as controller 400 of FIG. 4. The memory elements can include local memory employed during actual execution of the program code, such as nonvolatile memory 404 of FIG. 4, bulk storage, and cache memories which provide temporary storage of at least some program code in order to reduce the number of times code must be retrieved from bulk storage during execution.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer-implemented method, comprising:
   selecting a first tape to write a first copy of a first portion of data to;
   sending an instruction to write the first copy of the first portion of data to a first partition on the first tape, wherein the first tape has at least the first partition and a second partition;
   selecting a second tape that is different than the first tape to write a second copy of the first portion of data to; and sending an instruction to write the second copy of the first portion of data to a second partition on the second tape, wherein the second tape has at least a first partition and the second partition, wherein the first partition on each of the first and second tapes is closer to a beginning of the respective tape than the second partition on the respective tape.

2. The computer-implemented method as recited in claim 1, wherein the first and second partitions on each of the first and second tapes have an about equal dimensional length measured along a longitudinal axis of each of the respective tapes.

3. The computer-implemented method as recited in claim 1, wherein the first and second partitions on each of the first and second tapes have different dimensional lengths measured along a longitudinal axis of each of the respective tapes.

4. The computer-implemented method as recited in claim 3, wherein the dimensional length of the first partition is shorter than the dimensional length of the second partition on both of the first and second tapes.

5. The computer-implemented method as recited in claim 1, wherein selecting the first and second tapes is done pseudo-randomly.

6. The computer-implemented method as recited in claim 1, comprising:

selecting a third tape that is different than the first and second tapes to write a third copy of the first portion of data to; and sending an instruction to write the third copy of the first portion of data to a third partition on the third tape, wherein the third tape has at least a first partition, second partition and the third partition, wherein the first partition on the third tape is closer to a beginning of the respective tape than the second and third partitions on the respective tape, wherein the second partition on the third tape is closer to the beginning of the respective tape than the third partition on the respective tape.

7. A computer program product comprising a computer readable storage medium having program instructions embodied therewith, the program instructions executable by a processor to cause the processor to:

select, by the processor, a first tape to write a first copy of a first portion of data to;

send, by the processor, an instruction to write the first copy of the first portion of data to a first partition on the first tape, wherein the first tape has at least the first partition and a second partition;

select, by the processor, a second tape that is different than the first tape to write a second copy of the first portion of data to; and send, by the processor, an instruction to write the second copy of the first portion of data to a second partition on the second tape, wherein the second tape has at least a first partition and the second partition, wherein the first partition on each of the first and second tapes is closer to a beginning of the respective tape than the second partition on the respective tape.

8. The computer program product of claim 7, wherein the first and second partitions on each of the first and second tapes have an about equal dimensional length measured along a longitudinal axis of each of the respective tapes.

9. The computer program product of claim 7, wherein the first and second partitions on each of the first and second tapes have different dimensional lengths measured along a longitudinal axis of each of the respective tapes.

10. The computer program product of claim 9, wherein a data capacity of the first partition is less than a data capacity of the second partition on both of the first and second tapes.

11. The computer program product of claim 7, wherein selecting the first and second tapes is done pseudo-randomly.

12. The computer program product of claim 7, wherein the program instructions are executable by the processor to cause the processor to:

selecting a third tape that is different than the first and second tapes to write a third copy of the first portion of data to; and sending an instruction to write the third copy of the first portion of data to a third partition on the third tape, wherein the third tape has at least a first partition, second partition and the third partition, wherein the first partition on the third tape is closer to a beginning of the respective tape than the second and third partitions on the respective tape, wherein the second partition on the third tape is closer to the beginning of the respective tape than the third partition on the respective tape.

13. A computer program product comprising a computer readable storage medium having program instructions embodied therewith, the program instructions executable by a processor to cause the processor to:

receive, by the processor, a request to read a portion of data;

determine, by the processor, whether the portion of data is located in a first partition of a tape loaded in a tape drive;

send, by the processor, an instruction to read the portion of data from the first partition in response to determining that the portion of data is located in the first partition of the tape loaded in the tape drive;

determine, by the processor, whether the portion of data is located in a second partition of the tape loaded in the tape drive in response to determining that the portion of data is not located in the first partition of the tape loaded in the tape drive; and send, by the processor, an instruction to read the portion of data from the second partition in response to determining that the portion of data is located in the second partition of the tape loaded in the tape drive, wherein the first partition is closer to a beginning of the tape than the second partition.

14. The computer program product of claim 13, wherein the program instructions are executable by the processor to cause the processor to:

determine, by the processor, whether the portion of data is located in a first partition of a tape in a tape library in response to determining that the portion of data is not located in the second partition of the tape loaded in the tape drive;

send, by the processor, an instruction to load a tape having the portion of data located in a first partition thereof into the tape drive in response to determining that the portion of data is located in the first partition of the tape in the tape library; and send, by the processor, an instruction to read the portion of data from the first partition of the tape loaded from the tape library.

15. The computer program product of claim 14, wherein the program instructions are executable by the processor to cause the processor to:

determine, by the processor, whether the portion of data is located in a second partition of a tape in the tape library in response to determining that the portion of data is not located in a first partition of a tape in the tape library;

send, by the processor, an instruction to load a tape having the portion of data located in a second partition thereof into a tape drive in response to determining that the portion of data is located in the second partition of the tape in the tape library; and send, by the processor, an instruction to read the portion of data from the second partition of the tape loaded from the tape library.

16. The computer program product of claim 15, wherein the program instructions are executable by the processor to cause the processor to:

determine, by the processor, whether the portion of data is located in a third partition of a tape in the tape library in response to determining that the portion of data is not located in a second partition of a tape in the tape library;

send, by the processor, an instruction to load a tape having the portion of data located in a third partition thereof into a tape drive in response to determining that the portion of data is located in the third partition of the tape in the tape library; and send, by the processor, an instruction to read the portion of data from the third partition of the tape loaded from the tape library.

17. The computer program product of claim 16, wherein the tape having the portion of data in a third partition thereof also has a first and second partition, wherein the first partition is closer to a beginning of the respective tape than the second and third partitions, wherein the second partition is closer to the beginning of the respective tape than the third partition on the respective tape.

18. The computer program product of claim 13, wherein the first partition on the tape loaded in the tape drive is closer to a beginning of the tape than the second partition.

19. The computer program product of claim 13, wherein the first and second partitions on the tape loaded in the tape drive each have an about equal dimensional length measured along a longitudinal axis of the tape.

20. The computer program product of claim 13, wherein the first and second partitions on the tape loaded in the tape drive each have different dimensional lengths measured along a longitudinal axis of the tape.

* * * * *